United States Patent [19]

Conner, Jr. et al.

[11] Patent Number: 4,842,332

[45] Date of Patent: Jun. 27, 1989

[54] CUSHIONING SEAT COVERING FOR A CYCLE SADDLE

[76] Inventors: Donald W. Conner, Jr., 12231 Tamerlane Dr., No. C, Garden Grove, Calif. 92640; Craig A. Munoz, 2544 W. Winston, Unit D-2, Anaheim, Calif. 92804

[21] Appl. No.: 175,765

[22] Filed: Mar. 31, 1988

Related U.S. Application Data

[63] Continuation of Ser. No. 15,173, Feb. 17, 1987, abandoned.

[51] Int. Cl.⁴ .................................. B62J 1/18
[52] U.S. Cl. ................................ 297/214; 297/219; D6/354
[58] Field of Search ......... 297/195, 202, 214, DIG. 1, 297/219; D6/354

[56] References Cited

U.S. PATENT DOCUMENTS

| | | | |
|---|---|---|---|
| 2,007,994 | 7/1935 | Anderson | 297/214 X |
| 3,756,653 | 9/1973 | Worley | 297/195 |
| 3,758,153 | 9/1973 | Bonikowski | 297/214 X |
| 3,758,154 | 9/1973 | Kitaguchi | 297/214 |
| 3,997,214 | 12/1976 | Jacobs | 297/DIG. 1 X |
| 4,218,090 | 8/1980 | Hoffacker et al. | 297/195 X |

FOREIGN PATENT DOCUMENTS 24362 3/1896 United Kingdom ............... 297/202

*Primary Examiner*—Peter R. Brown
*Attorney, Agent, or Firm*—Plante, Strauss & Vanderburgh

[57] ABSTRACT

There is disclosed a cushion covering for a bicycle saddle which is of a laminated construction that includes a relatively thick, cushioning elastomeric base layer, a tough fabric overlay adhesively bonded to the top surface of the elastomeric base layer, and a permanent, pressure-sensitive adhesive coating on the under surface of the elastomeric base layer to bond the cushion covering to the seat portion of the bicycle saddle. The cushion covering is applied to only the seat portion of the saddle, terminating short of its vertical side flanks. Preferably the cushion covering has bevelled edges coextensive with the vertical side flanks and, most preferably, coextensive about its entire periphery.

6 Claims, 3 Drawing Sheets

CUSHIONING SEAT COVERING FOR A CYCLE SADDLE

This is a continuation of application Ser. No. 015,173 filed Feb. 17, 1987, now abandoned.

BACKGROUND OF THE INVENTION

1. Field of the Invention

This invention relates to a cushion covering for a cycle saddle and, in particular, to a cushion covering for use with the saddles commonly used on sport and motocross cycles.

2. Brief Statement of the Prior Art

The saddle commonly used with sports bicycles is a molded plastic saddle that is formed on a saddle tree which is supported on the upright standard of a bicycle. This molded plastic saddle has an arcuate seat of a generally flattened paraboloid shape that is contiguous with a pommel having a generally horizontal saddle horn.

The aforementioned molded seats are generally uncomfortable as they are formed of rigid plastic and offer no cushioning for the rider. Attempts have been made to attach cushions to these saddles, including tie-on cushions of fabric and elastomeric materials which are laid over the saddle, extending downwardly along the vertical flanks or sides of the saddle. These coverings have not found a wid popularity primarily because they are unduly cumbersome and interfere with movement of the bicycle rider, and do not stay in place on the cycle saddle.

BRIEF STATEMENT OF THE INVENTION

This invention comprises a cushion covering for a bicycle saddle, and the combination of a bicycle saddle with the cushion covering, in which the cushion covering is formed of a laminated construction that includes a relatively thick, cushioning elastomeric base layer, a tough fabric overlay adhesively bonded to the top surface of the elastomeric base layer, and a permanent, pressure-sensitive adhesive coating on the under surface of the elastomeric base layer to bond the cushion covering to the seat portion of the bicycle saddle. The cushion covering is applied to only the seat portion of the saddle, terminating short of its vertical side flanks. Preferably the cushion covering has bevelled edges coextensive with the vertical side flanks and, most preferably, coextensive about its entire periphery.

BRIEF DESCRIPTION OF THE DRAWINGS

The invention will be described with reference to the figures of which.

DESCRIPTION OF PREFERRED EMBODIMENTS

Figure 1:
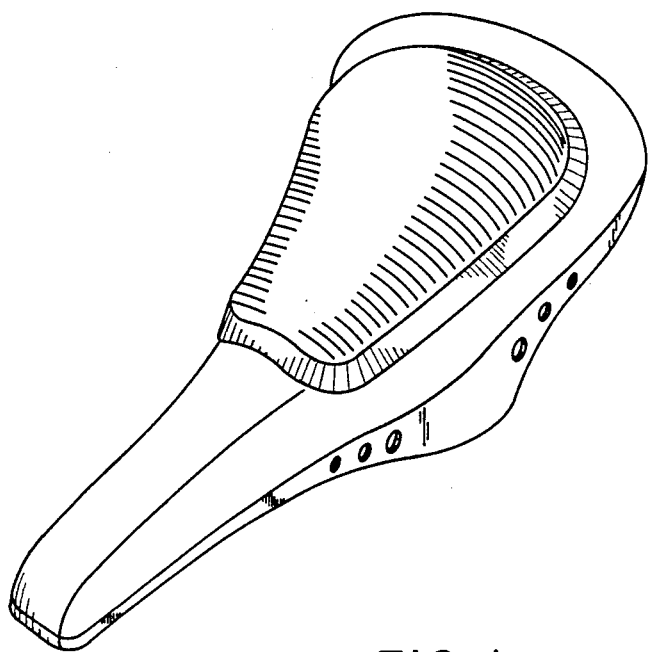
FIG. 1 is a perspective view of a bicycle saddle with the cushion covering of the invention applied thereto.
Figure 2:
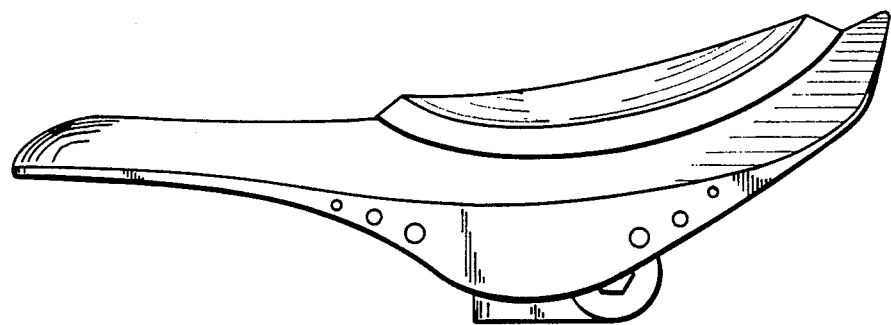
FIG. 2 is a side elevational view of the saddle with the cushion covering of the invention.

Referring now to FIGS. 1 and 2, the cushioning covering 10 of the invention is shown in its proper application to a conventional bicycle seat 29. This bicycle seat has a seat portion 30 with a contiguous pommel 32 that terminates in a generally horizontal saddle horn 34. The seat 30 extends laterally to generally vertical side flanks 36.

Figure 3:
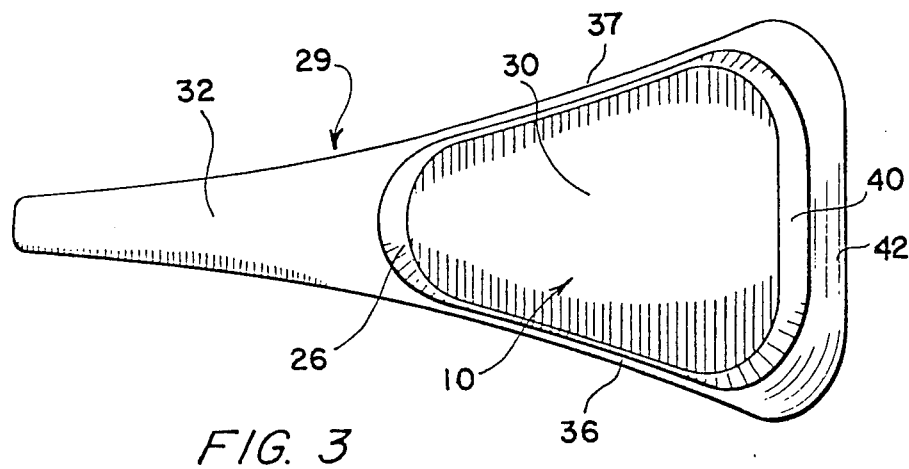
FIG. 3 is a plan view of the top of the saddle with the cushion covering of the invention.

The cushion covering 10 of the invention is sized to be coextensive with the seat portion 30 of the bicycle saddle 29 but terminating short of the side flanks 36. FIG. 3 illustrates that the seat portion 30 of the saddle is entirely covered with the cushion covering 10. The forward portion 38 of the cushioning laminate layer 10 also terminates short of the pommel 32 of the saddle. In this manner, the cushion covering 10 covers substantially all of seat 30 of the saddle but does not cover the side flanks or the pommel of the saddle. The cushioning layer thereby is precisely located at the most needed or critical area, directly beneath the vertebrae of the rider, where it is effective in providing cushioning to prevent bruises and injuries which are otherwise experienced with the very firm and hard saddles which are commonly in use.

As shown in FIG. 2, the entire side flank 36 of the saddle is not covered by the cushion 10. The rear edge 40 of the cushion covering 10 extends adjacent and parallel to the rear edge 42 of the cycle saddle. The cushion covering thus does not change the profile of the saddle, or interfere with the movements of the rider.

Figure 4:
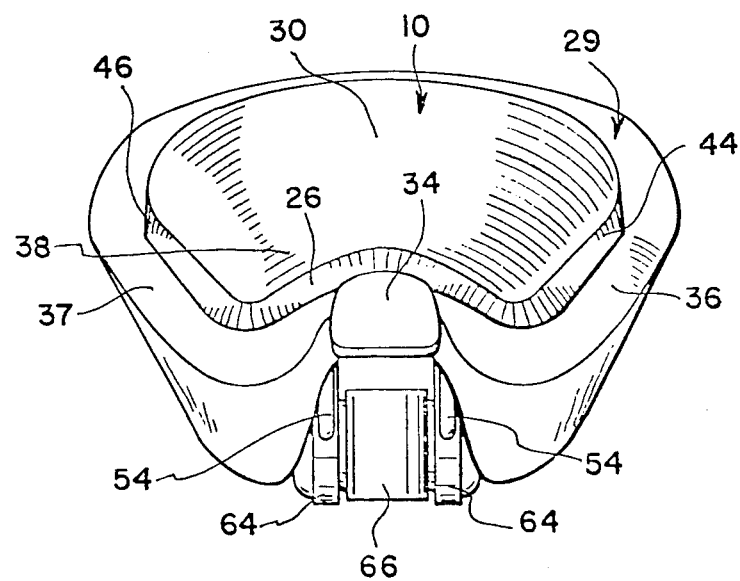
FIG. 4 is a front view of the saddle with the cushion covering of the invention.

Referring now to FIG. 4, the saddle and covering are shown in a front, elevational view. As there illustrated, the cushion covering 10 is a laminate layer which extends substantially over the entire width of the seat portion 30 of saddle, but terminating with its opposite side edges 44 and 46 short of the vertical side flanks 36 and 37 of the saddle. The edge 26 of the covering laminate layer 10 is bevelled such that when it is applied to the seat, the bevelled edges 44 and 46 which lie along the sides of the saddle are substantially vertical, as shown in FIG. 4, and thus do not change the width of the saddle or interfere with the rider's movements.

As illustrated in FIG. 4, the saddle tree for the saddle comprises a wire or tubular frame which is formed of forwardly extending members 54 that support the forward, horizontal saddle horn 34 of the saddle. The arms 54 extend into imbedded reception in plastic bosses (not shown) which are molded into the undersurface of the plastic saddle. The rear of the saddle is supported by similar upright arms (not shown).

The aforementioned support arms of the saddle tree are joined approximately directly beneath the seat portion of the saddle by brackets 64 which surround a tubular clamp 66 that is secured to the vertical standard of the cycle. This saddle construction, while very popular, provides no shock absorption for the rider, as it is molded entirely from stiff and relatively non-flexible plastic, without any cushioning layer.

The cushion covering 10 of the invention is bonded to the plastic seat of the saddle with a permanent pressure sensitive adhesive. Pressure sensitive adhesives are commonly a coating of an elastomer, referred to as a mass coat, which has a desirably high tack surface. Usually the elastomer is applied to the back of the substrate, in this case, the elastomeric base layer 18 as a solution in a volatile solvent, which is inert to the substrate. Various elastomers which have the property of forming a coating with a tacky surface can be applied, such as: natural rubber, styrene-butadiene rubber, syrene-butadiene-styrene block copolymers, neoprene, etc. These elastomers are dissolved in a suitable volatile solvent such as aliphatic and aromatic hydrocarbons. The tacky property of the resultant coating of the elastomer can be enhanced by the inclusion of adhesive materials such as terpene resins, phenolic resins, partially hydrogenated rosin esters, etc. in the solution before its application to the substrate.

A preferred adhesive is a laminate or double faced, pressure sensitive coating which is available under the designation 120 from the Arlon division of Keene Corporation, Santa Ana, Calif. This coating has a polyester sheet carrier which is coated on both sides with a styrene-butadiene resin.

Figure 5:
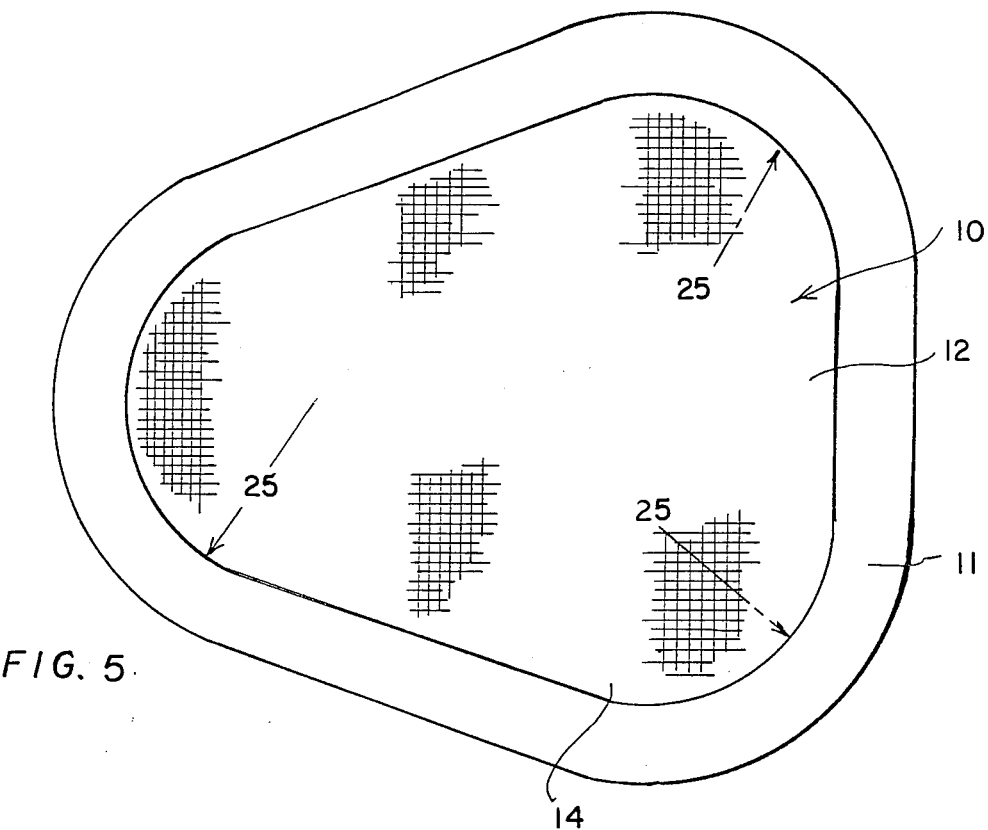
FIG. 5 is a plan view of the cushion covering of the invention in its flat configuration.
Figure 6:
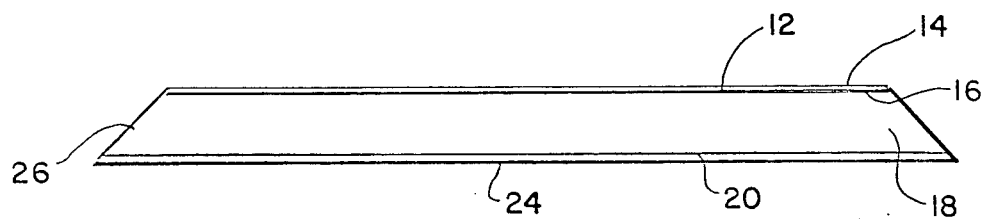
FIG. 6 is an elevational side view of the cushion covering of the invention.

Referring now to FIGS. 5 and 6, the cushion covering 10 is a generally triangular sheet 11 having an top surface 12 which is covered with a fabric sheet 14 that is adhesively bonded to its top surface by a permanent, pressure-sensitive adhesive entirely across the interface 16 between the undersurface of fabric 14 and the top surface 12 of the base layer 18. The base layer 18 is a relatively thick, elastomer material having a thickness from about 0.25 to about 0.75 inch. As shown in FIG. 1, the corners of the triangular base layer 18 are preferably filleted or arcuate, with a smooth radius of curvature 25.

The undersurface 20 of base layer 18 is entirely coated with a coextensive surface coating of a permanent, pressure-sensitive adhesive layer 24. Preferably, the adhesive layer 24 is the aforementioned, double faced covering. This adhesive layer has an overall thickness of about 4-5 mils, and the permanent, pressure sensitive adhesive on the undersurface is covered with a peel-off, protective sheet. The base layer 18 is bevelled about its entire edge shown as the bevel 26 that extends about the entire periphery of its generally triangular shape. The angle of this bevel shown as A in FIG. 2 is preferably from about 30 to about 60° degrees, most preferably about 45°.

Suitable materials for use in the cushion covering shown in FIGS. 1 and 2 are natural or synthetic rubber, preferably synthetic rubber, e.g., neoprene, styrene-butadiene, isoprene, etc. Of the aforementioned, neoprene is the most preferred because of its availability and toughness. Suitable material for the fabric layer 14 is any strong, durable fabric. Examples of such include polyesters, Nylon, etc. Of these, Nylon and most preferably a Nylon available under the trade name Lycra is used for this purpose.

The cushion covering 10 of the invention provides a number of important advantages for the user. First, it covers only a limited area, the seat, of the cycle saddle and this area is the area which requires cushioning. As the cushion covering does not extend to the vertical flanks of the saddle, it avoids the rubbing and wearing against the legs of the cyclist and thus does not interfere with the cycling activity. Also, the cushion covering is permanently bonded to the seat of the cycle saddle without the use of ties or other tabs or straps. This, too, eliminates obstructions which could interfere with the cyclist activities. Finally, the bevelled edge 26 of the cushioning layer can be colored with any bright or iridescent pigment to provide a racing stripe on the saddle. For this purpose the entire base layer 10 can be a colored or pigmented elastomeric material and can have a color which contrasts to the color of the fabric sheet 14.

The invention has been described with reference to the illustrated and presently preferred embodiment. It is not intended that the invention be unduly limited by this disclosure of the presently preferred embodiment. Instead, it is intended that the invention be defined by the means, and their obvious equivalents, set forth in the following claims.

What is claimed is:

1. A cycle saddle comprising:
   a. a molded rigid plastic saddle having:
      (1) an elongated, narrow seat with a smooth, unbroken and arcuate surface and opposite, vertical side flanks;
      (2) a contiguous pommel, and
      (3) a horizontal saddlehorn; and
   b. a single seat covering of uniform thickness centrally positioned on said seat, with its entire periphery spaced inwardly of the periphery of the arcuate seat of said saddle, and comprising:
      (1) a cushioning elastomeric base layer having a thickness from 0.25 to about 1.0 inch and bevelled about its entire peripheral edge;
      (2) a fabric overlay adhesively bonded to the top surface of said elastomeric base and extending to the bevelled edge thereof; and
      (3) a permanent, pressure sensitive adhesive coating on the underside of said elastomeric base and bonding said seat covering to said seat; with said seat covering overlying and bonded to the arcuate seat of said saddle, said seat covering having its edges bevelled sufficiently to provide substantial vertical side edges along the sides of said arcuate seat of said saddle; whereby said edges of said seat covering are recessed from rubbing and wearing contact with the legs of a cyclist on said saddle.

2. The combination of saddle and cushion of claim 1 wherein said bevel is at an angle from 30 to about 60 degrees with the surface of said base layer.

3. The combination of saddle and cushion of claim 1 wherein said fabric overlay is plastic.

4. The combination of saddle and cushion of claim 1 wherein said seat covering extends forwardly to the pommel of said saddle and terminates at said pommel.

5. The combination of saddle and cushion of claim 1 wherein said seat has a plurality of apertures spaced about its surface, providing ventilation ports.

6. The combination of saddle and cushion of claim 1 wherein said side flanks are tapered inwardly at their base.

* * * * *